No. 794,537. PATENTED JULY 11, 1905.
S. McMILLEN.
TRUING GUIDE SURFACES OF PLANERS, &c.
APPLICATION FILED AUG. 19, 1904.
3 SHEETS—SHEET 1.
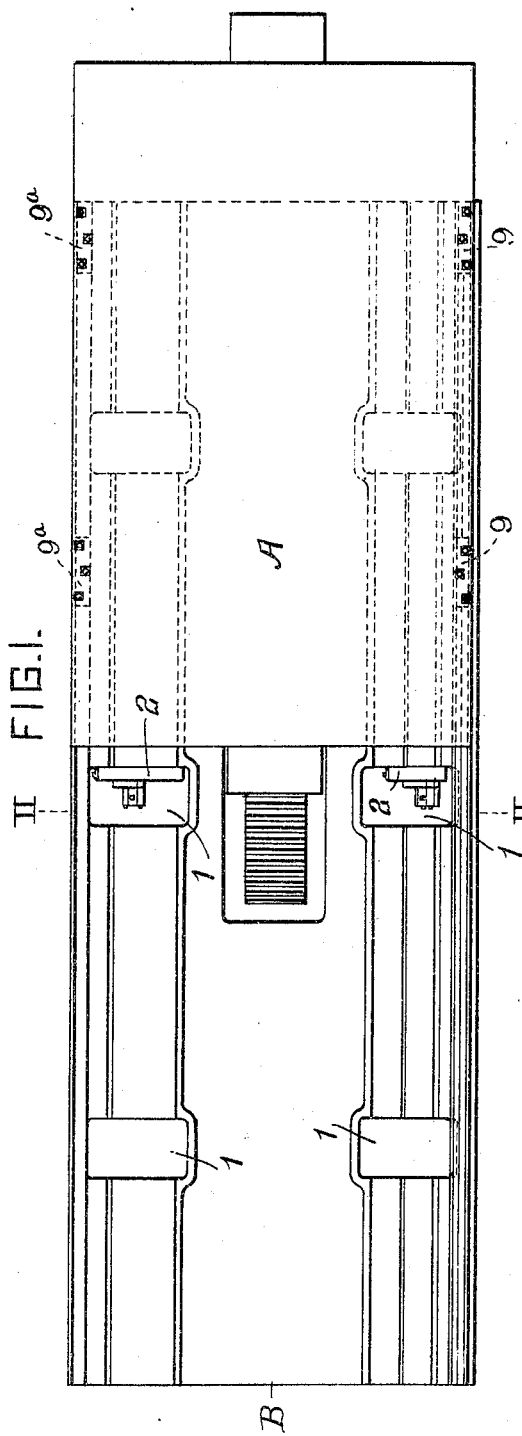
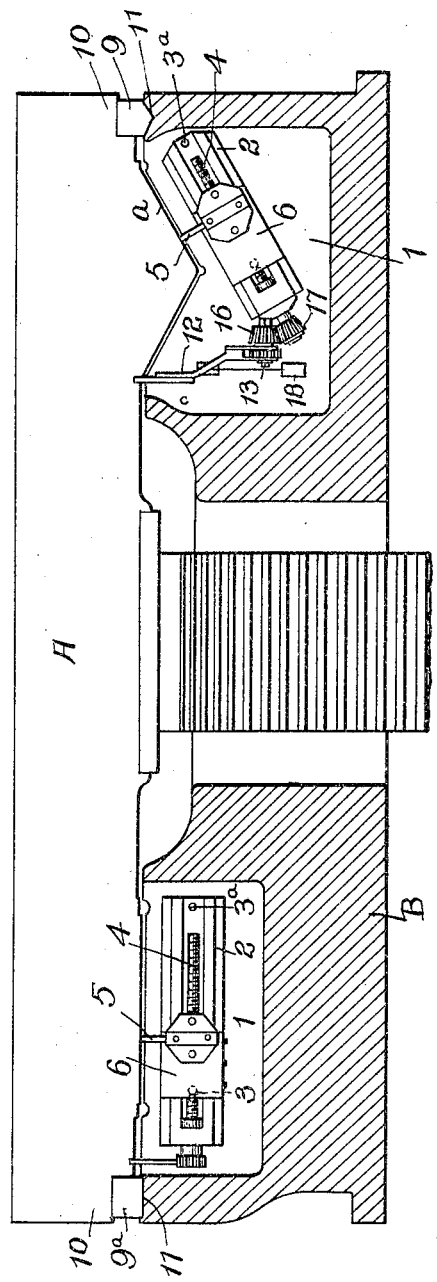
WITNESSES:
Herbert Bradley
J. C. Gaither
INVENTOR
Samuel McMillen
by Christy and Christy
Atty's No. 794,537. PATENTED JULY 11, 1905.
S. McMILLEN.
TRUING GUIDE SURFACES OF PLANERS, &c.
APPLICATION FILED AUG. 19, 1904.
3 SHEETS—SHEET 2.
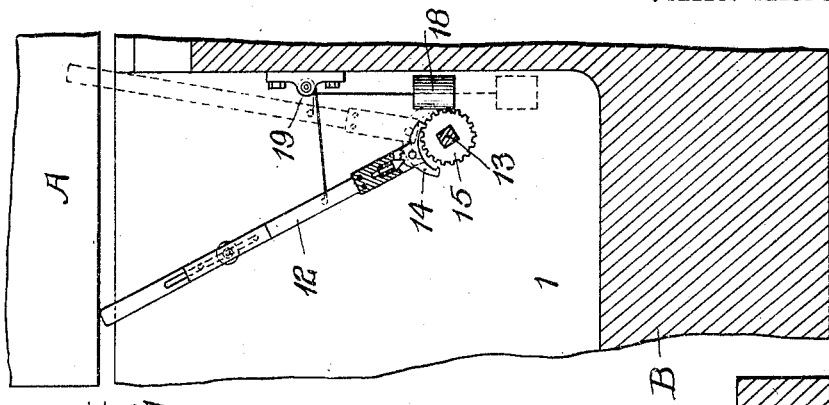
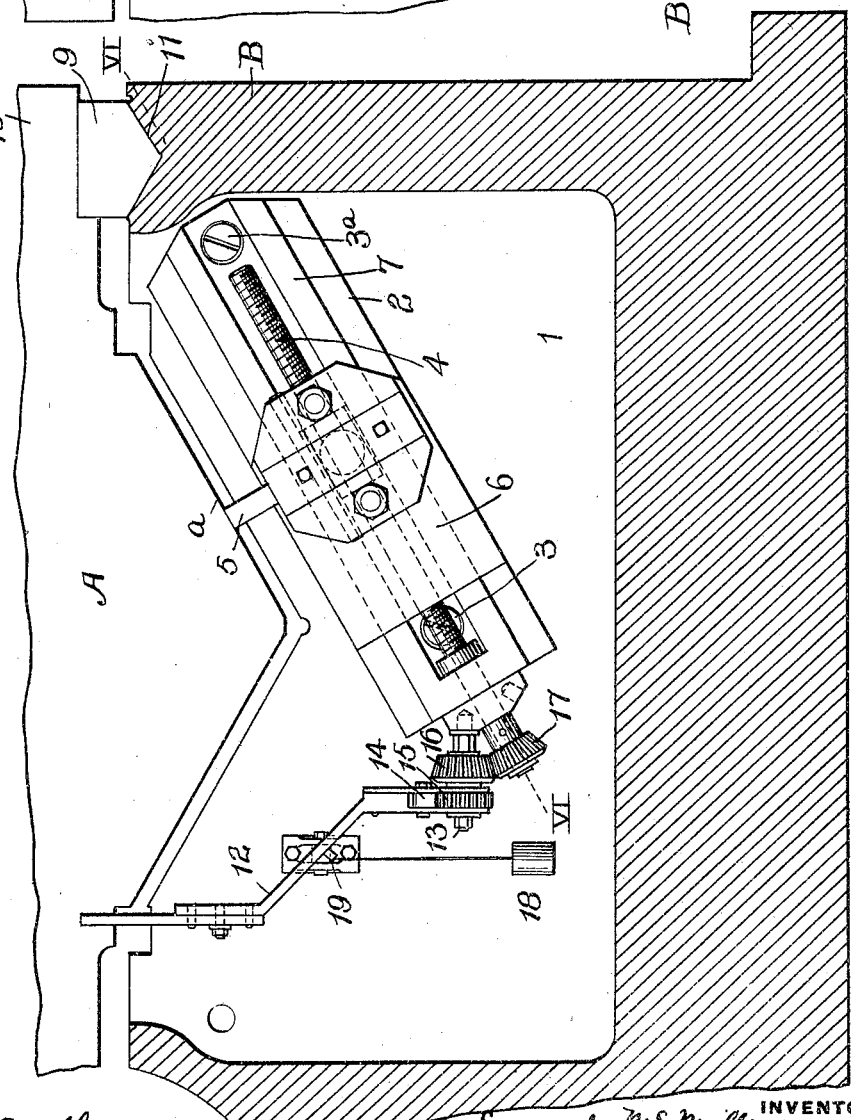
WITNESSES:
Herbert Bradley.
F. E. Gaither
INVENTOR
Samuel McMillen
by Christy and Christy,
Att'ys.

No. 794,537. PATENTED JULY 11, 1905.
S. McMILLEN.
TRUING GUIDE SURFACES OF PLANERS, &c.
APPLICATION FILED AUG. 19, 1904.
3 SHEETS—SHEET 3.
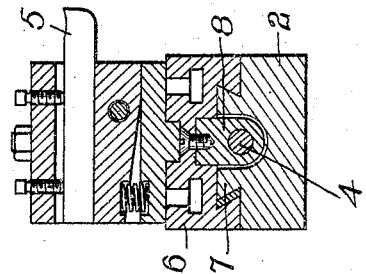
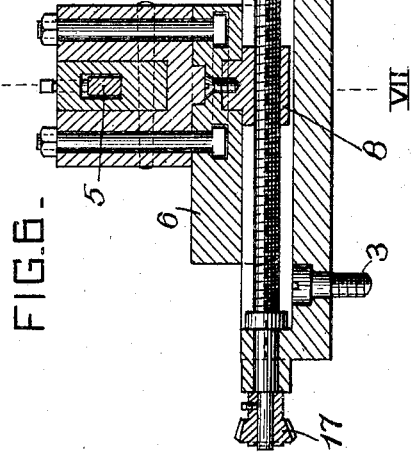
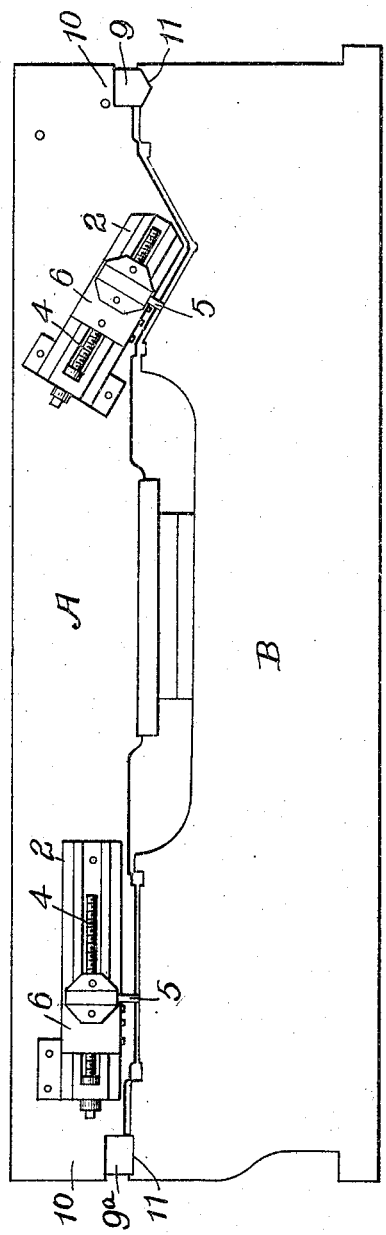
WITNESSES:
Herbert Bradley
G. E. Gaither
Samuel McMillen INVENTOR
by Christy and Christy,
Att'ys.

No. 794,537.

Patented July 11, 1905.

UNITED STATES PATENT OFFICE.

SAMUEL McMILLEN, OF PITTSBURG, PENNSYLVANIA, ASSIGNOR TO MACKINTOSH HEMPHILL & COMPANY, OF PITTSBURG, PENNSYLVANIA, A CORPORATION.

TRUING GUIDE-SURFACES OF PLANERS, &c.

SPECIFICATION forming part of Letters Patent No. 794,537, dated July 11, 1905.

Application filed August 19, 1904. Serial No. 221,442.

*To all whom it may concern:*

Be it known that I, SAMUEL McMILLEN, a citizen of the United States, residing at Pittsburg, in the county of Allegheny and State of Pennsylvania, have invented or discovered certain new and useful Improvements in Truing Guide-Surfaces of Planers, &c., of which improvements the following is a specification.

The invention described herein relates to certain improvements in mechanism for truing the contact or bearing surfaces of guides for planers; and the invention has for its object a construction whereby a tool may be attached to one of the parts—*i. e.*, the foundation or movable bed—and by the movement of the latter a cutting-tool is caused to operate on the surface of the opposing part to bring it to the desired smoothness and uniformity.

The invention is hereinafter more fully described and claimed.

In the accompanying drawings, forming a part of this specification, Figure 1 is a top plan view of a planer-bed and its support having my improved truing mechanism attached thereto. Fig. 2 is a transverse section on a plane indicated by the line II II, Fig. 1. Fig. 3 is an enlarged sectional view on the same plane as Fig. 2, illustrating the arrangement of the mechanism for truing the contact-surfaces of the V-guides on the planer-bed. Fig. 4 is a detail view illustrating the feed mechanism shown in Fig. 3. Fig. 5 is an end elevation showing the arrangement of the tools for cutting the bearing-surfaces of the guides on the foundation. Fig. 6 is a longitudinal section of the cutting-tool and its support, the plane of section being indicated by the line VI VI, Fig. 3; and Fig. 7 is a transverse section on a plane indicated by the line VII VII, Fig. 6.

In the practice of my invention for truing or straightening the bearing-surfaces of the movable bed the cutting-tool and its adjusting or feed mechanism is arranged in one of the pockets or recesses 1, commonly formed along the line of the guides in the foundation or bed-plate, as shown in Figs. 1, 2, and 3. This truing or cutting tool consists of a guide-bar 2, adapted to be secured to the vertical wall of the pocket 1 by means of screws or bolts 3. When the surfaces are V-shaped, as shown to the right in Fig. 2, one of the bolts 3 screws into the vertical wall in a plane passing through the apex of the V-shaped surfaces, as clearly shown in Fig. 3. The other bolt 3ª engages the wall in such a point that the feed-screw 4 of the truing-tool and the guide-surfaces of the bar 2 will be parallel with one of the V-shaped surfaces of the guide *a* of the movable bed.

The cutting-tool 5 is secured in a suitable gripping device carried by the block 6, which moves along V-shaped guides 7 on the bar 2, and the block 6 is provided with a lug 8, having a threaded opening therein for engagement with the feed-screw 4. Prior to the truing of these surfaces the bed A is raised, and distance-blocks 9 are interposed between auxiliary guide portions 10 and 11 on the under side of the movable bed and the bed-plate B, said blocks 9 being bolted to the bed. These blocks are made of such a thickness as to slightly raise the bed away from the main guiding-surfaces on the bed-plate, so that there will be ample clearance between respective guiding and supporting surfaces. By the back and forth reciprocation of the bed A, which is effected by the usual mechanism employed for that purpose, the guide-surfaces are caused to traverse back and forth across the cutting-tool, which is fed step by step transverse of these longitudinal guiding-surfaces by means of suitable mechanism. A convenient construction to this end consists of a lever 12, loosely mounted on a pin 13 and provided with a pawl 14, adapted to engage a toothed wheel 15, mounted on the pin and connected to or formed integral with a beveled pinion 16, adapted to intermesh with a similar pinion 17 on the end of the threaded feed-rod 4. The end of the lever 12 projects up into the path of movement of the bed A, so that as when the end of such bed strikes against the lever it will be shifted, thereby rotating through the gearing described, the threaded shaft producing a transverse movement of the cutting-tool. As the planer-bed moves backward the lever will be shifted in a reverse direction as soon as the end of the bed passes beyond it by any suitable means—such, for example, as the weight 18, having a flexible connection to the lever, such flexible connection passing over a guide-pulley 19, as shown in Fig. 4. As will be readily understood by those skilled in the art, the amount of feed effected by the shifting of the lever can be regulated or determined by the projection of the end of the lever up in front of the bed, and in order to permit a variation of feed the lever is provided with an adjustable end section, as shown in Figs. 3 and 4.

As soon as one of the V-surfaces has been straightened the screw or bolt 3ᵃ at the upper end is removed, the bar turned on the opposite screw 3, so as to be parallel with the other surface of the V, and the above operation repeated. Of course the feed-lever 12 and the parts carried thereby—i. e., the pin 13 and the pinions 15 and 16—must be shifted to the opposite side of the pocket or recess, and to this end the end of the supporting-bar 2 is provided with sockets on each side of the feed-screw for the reception of said pin, as shown in Fig. 3.

When it is desired to true or straighten the horizontal guiding-surfaces, as shown to the left in Fig. 2, the bar 2 is arranged parallel with said surfaces, and the operation of truing the surface is as described. It will be understood that when truing these horizontal or straight surfaces the lever 12 may be loosely mounted on the screw 4 and have a pawl-and-ratchet connection thereto. When truing the surfaces on the bed-plate, the bar 2 is secured to the end of the planer-bed parallel with the surfaces to be straightened, and the movement of the cutting-tool transverse of the surfaces can be effected by operating the feed-screw 4 by hand.

By the use of the auxiliary guides and the separating-blocks a twisting or deformation of the main guides on the bed-plate and movable bed can be corrected. When such correction is required, the movable bed is brought into the required relation to the bed-plate by means of separating-blocks of different thicknesses interposed between the auxiliary guiding-surfaces on the planer-bed and bed-plate, and the main guides straightened.

I claim herein as my invention—

1. A planer having in combination a bed plate or frame having guiding-surfaces, a movable bed having complementary guiding-surfaces, a dressing mechanism secured to one of said parts or members and means for reciprocating the bed, substantially as set forth.

2. A planer having in combination a bed plate or frame having main and auxiliary guiding-surfaces, a movable bed having complementary main and auxiliary guiding-surfaces, a dressing mechanism secured to one of said parts or members, separating-blocks interposed between the auxiliary guiding-surfaces on the bed-plate and bed, and means for reciprocating the movable bed, substantially as set forth.

3. A planer having in combination a bed plate or frame having guiding-surfaces, a movable bed having complementary guiding-surfaces, a dressing mechanism secured to one of said parts or members, means for reciprocating the bed, and automatic means for causing the tool of the dressing mechanism to move transversely of the guiding-surfaces, substantially as set forth.

4. A planer having in combination a bed-plate, a movable planer-bed, said parts being provided with main and auxiliary guiding-surfaces, arranged side by side, and movable blocks adapted to be interposed between the auxiliary guiding-surfaces and thereby separate the main guiding-surfaces substantially as set forth.

In testimony whereof I have hereunto set my hand.

SAMUEL McMILLEN.

Witnesses:
F. E. GAITHER,
DARWIN S. WOLCOTT.